United States Patent
Chae et al.

(10) Patent No.: US 10,641,347 B2
(45) Date of Patent: May 5, 2020

(54) CLUTCHING DEVICE OF AN AUTOMATIC TRANSMISSION

(71) Applicants: Hyundai Motor Company, Seoul (KR); Kia Motors Corporation, Seoul (KR)

(72) Inventors: Minho Chae, Incheon (KR); Juhyeon Park, Suwon-si (KR); Yong Uk Shin, Suwon-si (KR); Seongwook Ji, Gunpo-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 111 days.

(21) Appl. No.: 16/151,608

(22) Filed: Oct. 4, 2018

(65) Prior Publication Data

US 2019/0178305 A1 Jun. 13, 2019

(30) Foreign Application Priority Data

Dec. 11, 2017 (KR) .......................... 10-2017-0169263

(51) Int. Cl.
  *F16D 25/06* (2006.01)
  *F16H 63/30* (2006.01)
  *F16D 48/02* (2006.01)
  *F16D 25/0638* (2006.01)
  *F16D 129/02* (2012.01)

(52) U.S. Cl.
  CPC ......... *F16D 25/0638* (2013.01); *F16D 48/02* (2013.01); *F16H 63/3026* (2013.01); *F16D 2048/0212* (2013.01); *F16D 2129/02* (2013.01); *F16D 2300/14* (2013.01)

(58) Field of Classification Search
  None
  See application file for complete search history.

(56) References Cited

U.S. PATENT DOCUMENTS 3,747,730 A * 7/1973 Hause ................... F16H 47/085
                                                    192/48.611
4,957,195 A * 9/1990 Kano ................... F16D 25/0638
                                                    192/106 F (Continued)

FOREIGN PATENT DOCUMENTS

JP   2009-185928 A   8/2009
JP   2015-190526 A   11/2015

*Primary Examiner* — Colby M Hansen
(74) *Attorney, Agent, or Firm* — Morgan, Lewis & Bockius LLP

(57) ABSTRACT

A clutching device of an automatic transmission may include a clutch drum connected to a first rotation element, a clutch connected to the clutch drum and a second rotation element, and a piston device to operate the clutch, wherein the piston device may include a first piston forming a first sealed space with the first rotation element and the clutch drum and moving toward the clutch by a hydraulic pressure supplied to the first sealed space, a second piston forming a second sealed space with the first piston and moving toward the clutch to directly press the clutch by a hydraulic pressure supplied to the second sealed space, a spring retainer disposed on the first rotation element and forming a third space with the second piston and the first rotation element, and a return spring stored in the third space and abutted by the spring retainer and the second piston.

19 Claims, 3 Drawing Sheets

(56) References Cited

U.S. PATENT DOCUMENTS

| | | | | |
|---|---|---|---|---|
| 6,079,535 A | * | 6/2000 | Mueller | B60K 17/34 |
| | | | | 180/247 |
| 8,074,778 B2 | | 12/2011 | Jayaram et al. | |
| 8,967,352 B2 | * | 3/2015 | Kummer | F16D 21/06 |
| | | | | 192/48.611 |
| 9,004,249 B2 | * | 4/2015 | Seo | F16D 25/0638 |
| | | | | 192/48.611 |
| 9,255,634 B2 | | 2/2016 | Sasaki et al. | |
| 9,267,598 B2 | | 2/2016 | Kamada et al. | |
| 2003/0094343 A1 | * | 5/2003 | Showalter | F16D 25/02 |
| | | | | 192/35 |
| 2012/0073931 A1 | * | 3/2012 | Yun | F16D 25/0638 |
| | | | | 192/109 R |
| 2014/0083810 A1 | * | 3/2014 | Hwang | F16D 25/0638 |
| | | | | 192/85.63 |
| 2016/0230816 A1 | * | 8/2016 | DeGowske | F16D 11/10 |

* cited by examiner

CLUTCHING DEVICE OF AN AUTOMATIC TRANSMISSION

CROSS-REFERENCE TO RELATED APPLICATION

The present application claims priority to Korean Patent Application No. 10-2017-0169263 filed on Dec. 11, 2017, the entire contents of which is incorporated herein for all purposes by this reference.

BACKGROUND OF THE INVENTION

Field of the Invention

The present invention relates to a clutching device of an automatic transmission that connects or disconnects torque transmission between two rotation elements.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

For enhancing fuel consumption, a high efficiency engine, various approaches, such as a high efficiency transmission, a light-weight vehicle body, etc., are under investigation, and in the transmission field, a double clutch transmission and an automated manual transmission are also under research to compromise efficiency of a manual transmission and convenience of an automatic transmission.

In such a transmission, dry or wet clutches are used to transmit an engine torque, and a clutch used for a transmission requires a large torque capacity and control precision.

Until friction members of clutch disks and clutch plates of such a clutch meet each other, a rapid operating speed is required for immediate starting of power transmission, and after the friction members have met, large engaging force is required for ensuring power delivery through the clutch.

Recently a clutch shows sufficiently rapid operating speed and large engagement force, operating efficiency may be further optimized by an enhancement which is better appropriate for more precise control between a rapid operating speed and large engagement force.

Furthermore, a clutch may be damaged by fatigue accumulation by repeated application of a large engagement force and a rapid operating speed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a clutching device of an automatic transmission having advantages of enhanced shifting responsiveness and precision controlling.

A clutching device of an automatic transmission according to an exemplary embodiment of the present invention may include a clutch drum connected to a first rotation element, a clutch connected to the clutch drum and also connected to a second rotation element to connect or disconnect torque delivery between the first and second rotation elements, and a piston device to operate the clutch to connect the torque delivery between the first and second rotation elements, wherein the piston device may include first and second pistons, a spring retainer, and an return spring. The first piston forms a first sealed space with the first rotation element and the clutch drum, and moves toward the clutch by a hydraulic pressure supplied to the first sealed space through a first hydraulic line formed in the first rotation element. The second piston forms a second sealed space with the first piston, and moves toward the clutch to directly press the clutch by a hydraulic pressure supplied to the second sealed space through a second hydraulic line formed in the first rotation element and a third hydraulic line formed in the first piston. The spring retainer is disposed on the first rotation element and forms a third sealed space with the second piston and the first rotation element. The return spring is stored in the third sealed space, and is abutted by the spring retainer and the second piston to apply a restoring force to the first and second pistons.

The first piston may move on the first rotation element, and a moving stroke of the first piston may be limited by the spring retainer.

The spring retainer may be abutted by a stopper in a direction toward the clutch to support the return spring, and may tightly contact an external rim of the second piston interposing a seal. A fourth hydraulic line communicating with the third sealed space may be formed in the first rotation element to supply a compensation hydraulic pressure to the third sealed space.

The stopper may be formed as a snap ring fitted on the first rotation element.

External rims the first and second pistons may be coaxially disposed. The external rim of the first piston may tightly contact the clutch drum and the external rim of the second piston interposing a seal, respectively.

An internal rim of the first piston may be slidably disposed on the first rotation element. The third hydraulic line may be formed at the internal rim of the first piston such that the third hydraulic line is aligned with the second hydraulic line when the second piston is moved toward the clutch by the hydraulic pressure of the first sealed space.

An internal rim of the second piston may be radially external to the internal rim of the first piston and may tightly contact the internal rim of the first piston.

The first rotation element may be an input shaft that receives an output torque of an engine. The second rotation element may be one rotation element of three rotation elements of a planetary gear set.

According to an exemplary embodiment of the present invention, dual pistons are used for operation of a clutch that transmits torque, improving shifting responsiveness due to better gap control between friction members, and also improving power delivery efficiency by ensuring a large engagement force.

Due to sequentially controlling of the first and second pistons, fatigue accumulation caused to the friction members may be significantly reduced, reducing possibility of damage to the clutch.

In the case of releasing the clutch, drag loss of friction members may be reduces while enhancing reliability of controlling the clutch by cancelling centrifugal force of fluid remaining in spaces between the pistons and the clutch drum, since the returning operation of the pistons initiated by a return spring is accelerated by the compensation hydraulic pressure supplied to a space between the spring retainer and the second piston.

Since a return spring initiates the returning operation of the pistons, unstableness of returning operation of pistons may be reduced by minimizing effect of unstableness of low initial hydraulic pressure when the hydraulic pressure is solely used for returning the pistons.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
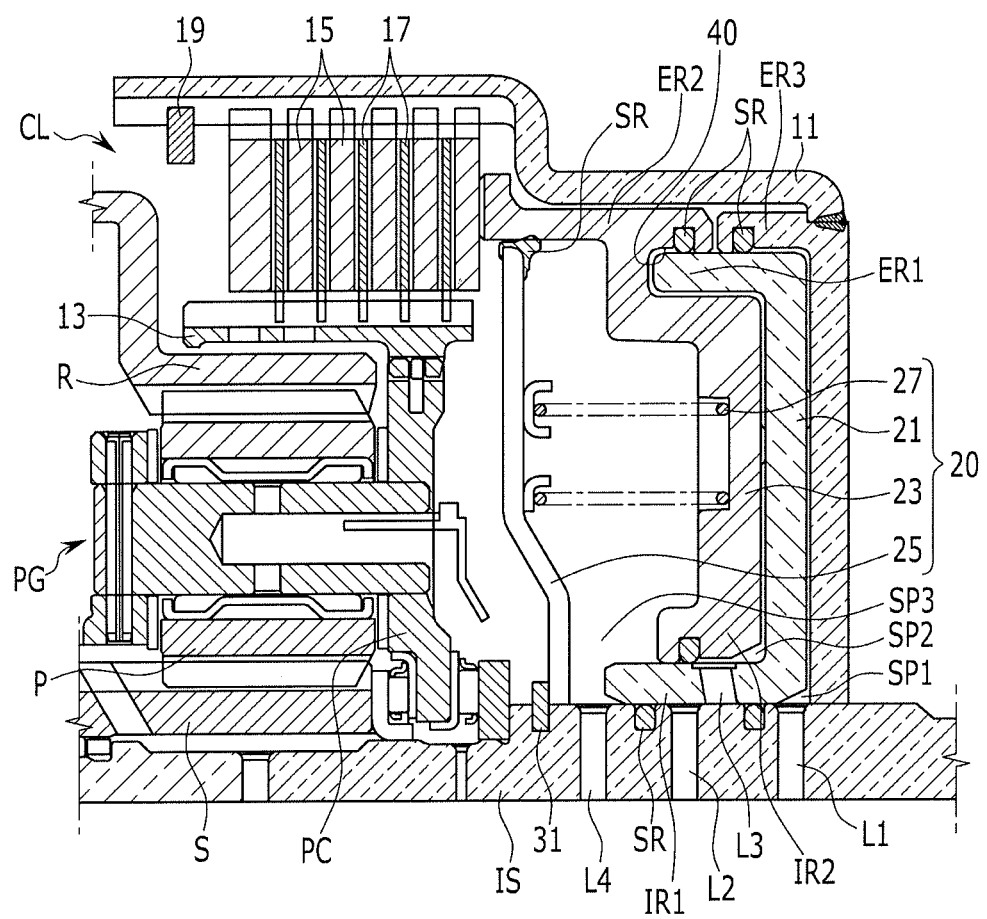
FIG. 1 is a cross-sectional view of a clutching device of an automatic transmission according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a cross-sectional view of a clutching device of an automatic transmission according to an exemplary embodiment of the present invention.

Referring to FIG. 1, a clutching device of an automatic transmission according to an exemplary embodiment of the present invention is a clutching device which is disposed between two rotation elements to control torque transmission therebetween.

The exemplary embodiment takes an example that torque transmission between an input shaft IS and a planet carrier PC of a planetary gear set PG as two rotation elements is controlled, i.e., connected or disconnected.

The planetary gear set PG is exemplified as a single pinion planetary gear set, however, it may not be understood that the disclosure is limited thereto. Various other types of planetary gear set, e.g., a double pinion planetary gear set, a compound planetary gear set, etc., may be applied with a clutching device of the embodiment. The planetary gear set PG includes three rotation elements of a sun gear S, a planet carrier PC, and a ring gear R. As well known in the art, the planet carrier PC rotatably supports a plurality of pinion gears P that are externally gear-meshed with the sun gear, and the ring gear R is internally gear-meshed with the plurality of pinion gears P.

A clutching device according to an exemplary embodiment of the present invention includes a clutch CL connected to a clutch drum 11 and also connected to a clutch hub 13, and a piston device 20 that controls an operation of the clutch CL. The clutch controls torque transmission between the clutch drum 11 and the clutch hub 13 according to an operating state of friction members 15 and 17 disposed in the clutch CL in a response to the operation of the piston device 20.

The clutch drum 11 is fixedly connected to the input shaft IS to rotate at a same speed. The input shaft is a mere example of a member that receives or outputs a torque. Thus, it may be connected to the engine output side to receive an engine torque, or it may be connected to a rotation element of another planetary gear set included in an automatic transmission.

The clutch hub 13 is fixedly connected to the planet carrier PC to rotate at a same speed. The planet carrier PC is a mere example of a member that receives or outputs a torque. Thus, it may be understood that the clutch hub 13 may be connected to another rotation element of the planetary gear set.

A plurality of clutch plates 15 as the friction members of the clutch CL are spline-engaged with an internal circumference of the clutch drum 11. A plurality of clutch disks 17 as the friction members of the clutch CL are spline-engaged with an external circumference of the clutch hub 13. Thus, when the clutch CL is operated, the friction members of the clutch plates 15 and the clutch disks 17 frictionally meet each other, facilitating torque transmission between the clutch drum 11 and the clutch hub 13, which means torque transmission between the input shaft IS and the planet carrier PC is enabled.

The plurality of clutch disks 17 are alternately disposed with the plurality of clutch plates 15, and an assembly of the clutch disks and plates 17 and 15 is supported by a snap ring 19.

The piston device 20 includes a dual piston arrangement of first and second pistons 21 and 23, a return spring 27 for applying a restoring force to the first and second pistons, and a spring retainer 25 that accommodates and supports the return spring 27.

The piston device 20 operates to apply engagement pressure to clutch CL by application of hydraulic pressure to the piston device 20.

The first piston 21 forms a first sealed space SP1 with the input shaft IS and the clutch drum 11, and a first hydraulic line L1 is formed in the input shaft IS. Therefore, the first piston 21 moves toward the clutch CL when a hydraulic pressure is supplied to the first sealed space SP1 through the first hydraulic line L1. The forward movement of the first piston 21 pushes the second piston 23 such that the second piston 23 pushes the clutch plates and disks 15 and 17 to contact each other.

The second piston 23 forms a second sealed space SP2 with the first piston 21. A second hydraulic line L2 is formed in the input shaft IS, and a third hydraulic line L3 is formed in the first piston 21 at a position rearward from the second hydraulic line L2 with a predetermined distance, such that the third hydraulic line L3 communicate with the second hydraulic line L2 when the second piston 23 has moved forward (i.e., toward the clutch CL) by the predetermined distance.

The second piston 23 moves toward the clutch CL to directly press the clutch CL by a hydraulic pressure supplied to the second sealed space SP2 through the second and third hydraulic lines L2 and L3.

As shown in FIG. 1, external rims ER1 and ER2 of the first and second pistons 21 and 23 are coaxially disposed. The external rim ER1 of the first piston 21 tightly contacts the clutch drum 11 and the external rim ER2 of the second piston 23 interposing a seal SR, respectively.

In an exemplary embodiment of the present invention, external rim ER1 of the first piston 21 tightly contacts external rim ER3 of the clutch drum 11 and the seal SR is mounted between the external rim ER3 of the clutch drum 11 and the external rim ER2 of the second piston 23.

In an exemplary embodiment of the present invention, the second piston 23 may include a receiving groove 40 at a rear side thereof to slidably receive the external rim ER1 of the first piston 21 therein.

An internal rim IR1 of the first piston 21 is slidably disposed on the input shaft IS. The third hydraulic line L3 is formed at the internal rim IR1 of the first piston 21 such that the third hydraulic line L3 is aligned with the second hydraulic line L2 when the second piston 23 is moved toward the clutch CL by the hydraulic pressure of the first sealed space SP1.

An internal rim IR2 of the second piston 23 is coaxially with and radially external to the internal rim IR1 of the first piston 21, and tightly contacts the internal rim IR1 of the first piston 21.

The spring retainer 25 is disposed on the input shaft IS and forms a third sealed space SP3 with the second piston 23 and the input shaft IS.

The spring retainer 25, formed in a disk shape, is abutted by a stopper 31 in a direction toward the clutch CL to support the return spring 27, and tightly contacts the external rim ER2 of the second piston 23 interposing a seal SR.

A fourth hydraulic line L4 communicating with the third sealed space SP3 is formed in the input shaft IS to supply a compensation hydraulic pressure to the third sealed space SP3.

The stopper 31 may be formed as a snap ring fitted on the input shaft IS.

The return spring 27 is stored in the third sealed space SP3 and is abutted by the spring retainer 25 and the second piston 23, to apply a restoring force to the first and second pistons 21 and 23.

The first piston 21 moves on the input shaft IS and a moving stroke of the first piston 21 is limited by the spring retainer 25.

Figure 2:
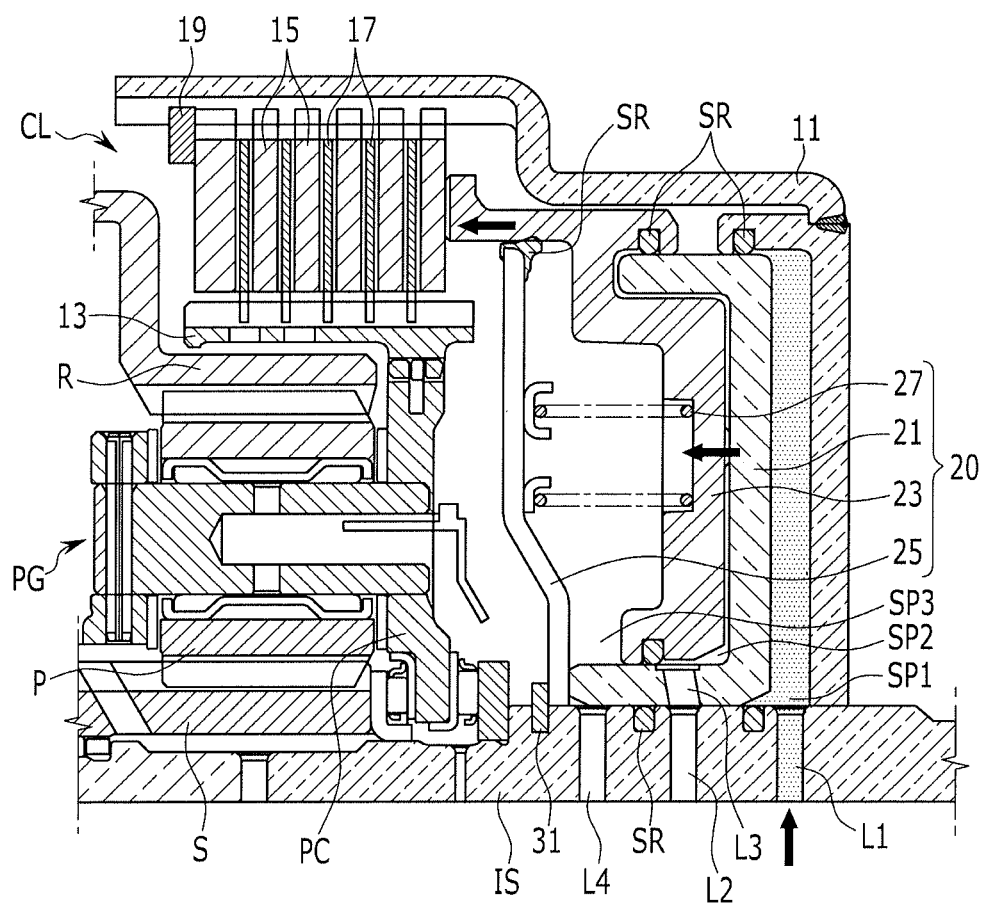
FIG. 2 is a cross-sectional view illustrating a first stage of a clutching device of an automatic transmission according to an exemplary embodiment of the present invention.
Figure 3:
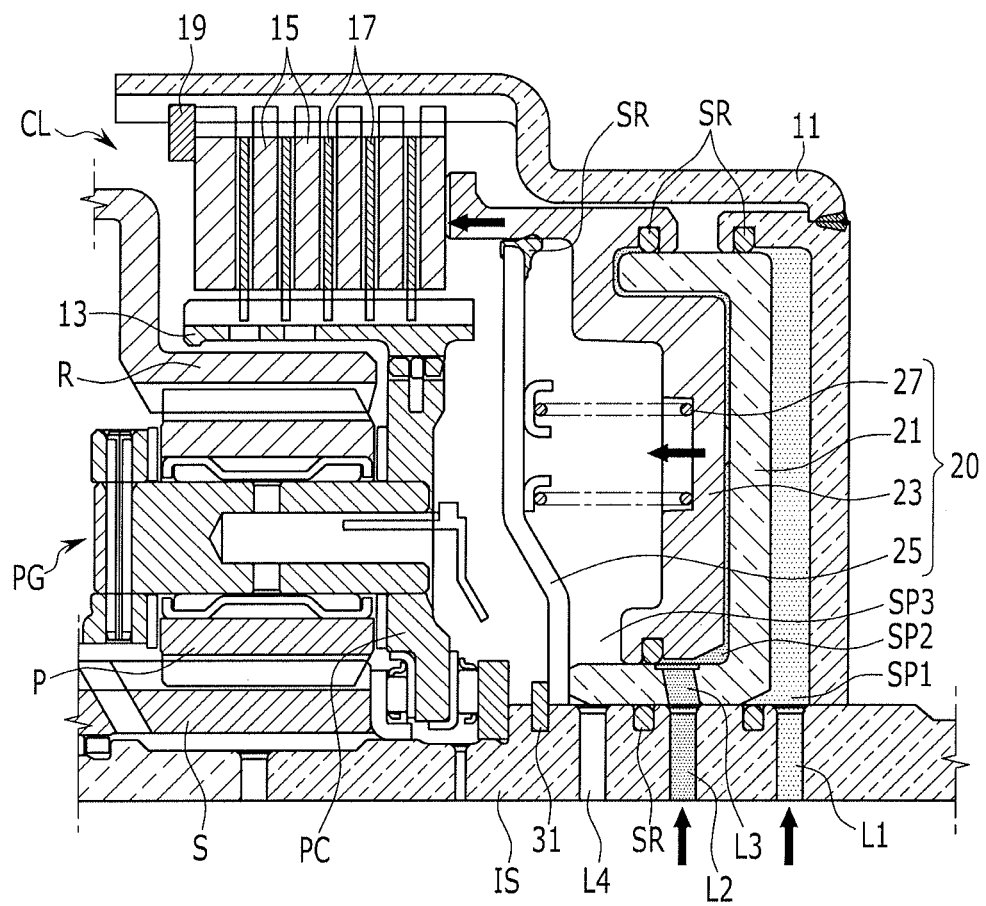
FIG. 3 is a cross-sectional view illustrating a second stage of a clutching device of an automatic transmission according to an exemplary embodiment of the present invention.

FIG. 2 is a cross-sectional view illustrating a first stage of a clutching device of an automatic transmission according to an exemplary embodiment of the present invention. FIG. 3 is a cross-sectional view illustrating a second stage of a clutching device of an automatic transmission according to an exemplary embodiment of the present invention.

Operation of a clutching device according to an exemplary embodiment of the present invention is hereinafter described in detail with reference to FIG. 2 and FIG. 3.

Referring to FIG. 2, when a hydraulic pressure is supplied to the first sealed space SP1 formed between the clutch drum 11 and the first piston 21 through the first hydraulic line L1, the first piston 21 pushes the second piston 23 toward the clutch CL and the first and second pistons 21 and 23 moves together toward the clutch CL.

Therefore, a frontal end portion of the second piston 23 pushes the clutch plates 15 and clutch disks 17 toward the snap ring 19. Since the stroke of the first piston 21 is limited by the stopper 31, the second piston 23 may also move by such distance by being pushed by the first piston 21. In the instant state, the plurality of clutch plates 15 and clutch disks 17 almost or slightly contact the snap ring 19. Here, the term "almost" means that with a small amount of more pressure on the second piston 23 the clutch CL may exert a maximum frictional force. Here, the term "slightly" means that frictional force formed by the clutch CL is less than maximum frictional force such that the frictional force may be controlled by controlling the pressure on the second piston 23.

Since the frictional members of the clutch CL are not fully operated by mere application of hydraulic pressure to the first sealed space SP1, the supplying of hydraulic pressure to the first sealed space SP1 may be controlled very rapidly, i.e., to very rapidly move the first and second pistons 21 and 23 in the first stage of engagement of the clutch CL. This means that the time for activating the clutch CL may be substantially reduced by a rapid initial movement of the first and second pistons 21 and 23 in the first stage.

At a full stroke of the first piston 21, as shown in FIG. 3, the second hydraulic line L2 and the third hydraulic line L3 are aligned to communicate with each other. In the instant state, a hydraulic pressure is supplied to the second sealed space SP2 formed between the first and second pistons 21 and 23 through the second and third hydraulic lines L2 and L3, and thereby the second piston 23 is pushed toward the clutch CL such that the clutch CL may form its maximum frictional force. It is notable that the frictional force formed by the clutch CL may be controlled by controlling the hydraulic pressure supplied to the second sealed space SP2.

According to such a sequential operation of two stages by the first and second pistons 21 and 23, the clutch CL may achieve a rapid responsiveness and a sufficiently large engagement force for torque connection between the input shaft IS and the planet carrier PC of the planetary gear set PG.

To release the operation of the clutch CL, the hydraulic pressures supplied to the first and second sealed spaces SP1 and SP2 through the first, second, and third hydraulic lines L1, L2, and L3 are released, and the first and second pistons 21 and 23 starts to move rearward thereof, i.e., to the right in the drawings, by the restoring force of the return spring 27.

In the early stage of releasing the hydraulic pressures in the first and second sealed spaces SP1 and SP2, fluid is not suddenly expelled from the first and second sealed spaces SP1 and SP2, and fluid remaining in the first and second sealed spaces SP1 and SP2 is applied with centrifugal force. Thus, such a centrifugal force may deteriorate the releasing speed of the clutch CL.

In an exemplary embodiment of the present invention, in an early stage of releasing the operation of the clutch CL, a hydraulic pressure is supplied to the third sealed space SP3 through the fourth hydraulic line L4 when the first piston 21 is slightly moved rearward and thereby the fourth hydraulic line L4 is open to the third sealed space SP3. Therefore, moving speed of the first and second pistons 21 and 23 is accelerated by the hydraulic pressure supplied to the third sealed space SP3. Thus, the hydraulic pressure supplied to the third sealed space SP3 acts as a compensation hydraulic pressure that cancels centrifugal forces applied to the remaining fluid in the first and second sealed spaces SP1 and SP2, and therefore, reliability of control of a clutch may be enhanced while reducing drag loss of friction members in the clutch.

As described above, according to a clutching device of an exemplary embodiment of the present invention, a shifting responsiveness is improved by rapid initial operating speed by employing dual pistons of the first and second pistons 21 and 23. Furthermore, precise control between friction members is enabled by precise control of the hydraulic pressure supplied to the second sealed space SP2.

Due to sequentially controlling of the first and second pistons 21 and 23, fatigue accumulation caused to the friction members may be significantly reduced, reducing possibility of damage to the clutch CL.

In the case of releasing the clutch CL, drag loss of friction members may be reduced while enhancing reliability of controlling the clutch CL by cancelling centrifugal force of fluid remaining in spaces between the pistons and the clutch drum, since the returning operation of the pistons 21 and 23 initiated by a return spring 27 is accelerated by the compensation hydraulic pressure supplied to a space between the spring retainer 25 and the second piston 23.

Since the return spring 27 initiates the returning operation of the pistons, unstableness of returning operation of pistons may be reduced by minimizing effect of unstableness of low initial hydraulic pressure when the hydraulic pressure is solely used for returning the pistons.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A clutching apparatus of an automatic transmission, the clutching apparatus comprising:
   a clutch drum connected to a first rotation element;
   a clutch connected to the clutch drum and a second rotation element rotatably engaged to the first rotation element and selectively transmitting a torque between the first and second rotation elements; and
   a piston device selectively operating the clutch to connect the first and second rotation elements,
   wherein the piston device includes:
      a first piston forming a first sealed space with the first rotation element and the clutch drum and movable toward the clutch by a first hydraulic pressure supplied to the first sealed space through a first hydraulic line formed in the first rotation element;
      a second piston forming a second sealed space with the first piston and movable toward the clutch to directly press the clutch by a second hydraulic pressure supplied to the second sealed space through a second hydraulic line formed in the first rotation element and a third hydraulic line formed in the first piston;
      a spring retainer fixed on the first rotation element and forming a third sealed space with the second piston and the first rotation element; and
      a return spring stored in the third sealed space and abutted by the spring retainer and the second piston to apply a restoring force to the first and second pistons.

2. The clutching apparatus of claim 1, wherein the first piston is movable on the first rotation element and a moving stroke of the first piston is limited by the spring retainer.

3. The clutching apparatus of claim 1,
   wherein a first and portion of the spring retainer is abutted by a stopper in a direction toward the clutch to support the return spring, and a second end portion of the spring retainer slidably contacts an external rim of the second piston, wherein a seal is mounted between the second end portion of the spring retainer and the external rim of the second piston, and
   wherein a fourth hydraulic line fluidically-communicating with the third sealed space is formed in the first rotation element to supply a compensation hydraulic pressure to the third sealed space.

4. The clutching apparatus of claim 3, wherein the stopper is formed as a snap ring fitted on the first rotation element.

5. The clutching apparatus of claim 3,
   wherein an internal rim of the first piston is slidably disposed on the first rotation element; and
   wherein the third hydraulic line is formed at the internal rim of the first piston such that the third hydraulic line is aligned with the second hydraulic line when the second piston is moved toward the clutch by the first hydraulic pressure of the first sealed space.

6. The clutching apparatus of claim 5, wherein an internal rim of the second piston is radially exterior to the internal rim of the first piston and slidably contacts the internal rim of the first piston.

7. The clutching apparatus of claim 1,
   wherein external rims of the first and second pistons are coaxially disposed; and
   wherein the external rim of the first piston slidably contacts the clutch drum and a seal is mounted between the external rim of the first piston and the clutch drum.

8. The clutching apparatus of claim 7, wherein the external rim of the first piston slidably contacts an external rim of the clutch drum.

9. The clutching apparatus of claim 7, wherein the second piston includes a receiving groove at a side of the second piston to slidably receive the external rim of the first piston therein.

10. The clutching apparatus of claim 1,
    wherein the first rotation element is an input shaft that receives an output torque of an engine; and wherein the second rotation element is one rotation element among three rotation elements of a planetary gear set, the three rotation elements including the first rotation element, the second rotation element, and a third rotation element.

11. A clutching apparatus of an automatic transmission, the clutching apparatus comprising:
  a clutch drum connected to an input shaft;
  a clutch connected to the clutch drum and connected to a planet carrier of a planetary gear set to selectively transmit torque between the input shaft and the planet carrier; and
  a piston device selectively operating the clutch to connect the input shaft and the planet carrier,
  wherein the piston device includes:
    a first piston forming a first sealed space with the input shaft and the clutch drum and movable toward the clutch by a first hydraulic pressure supplied to the first sealed space through a first hydraulic line formed in the input shaft;
    a second piston forming a second sealed space with the first piston and movable toward the clutch to directly press the clutch by a second hydraulic pressure supplied to the second sealed space through a second hydraulic line formed in the input shaft and a third hydraulic line formed in the first piston;
    a spring retainer fixed on the input shaft and forming a third sealed space with the second piston and the input shaft; and
    a return spring stored in the third sealed space and abutted by the spring retainer and the second piston to apply a restoring force to the first and second pistons.

12. The clutching apparatus of claim 11, wherein the first piston is movable on the input shaft and a moving stroke of the first piston is limited by the spring retainer.

13. The clutching apparatus of claim 11,
  wherein a first end portion of the spring retainer is abutted by a stopper in a direction toward the clutch to support the return spring, and a second end portion of the spring retainer slidably contacts an external rim of the second piston, wherein a seal is mounted between the second end portion of the spring retainer and the external rim of the second piston; and
  wherein a fourth hydraulic line fluidically-communicating with the third sealed space is formed in the input shaft to supply a compensation hydraulic pressure to the third sealed space.

14. The clutching apparatus of claim 13,
  wherein an internal rim of the first piston is slidably disposed on the input shaft; and
  wherein the third hydraulic line is formed at the internal rim of the first piston such that the third hydraulic line is aligned with the second hydraulic line when the second piston is moved toward the clutch by the first hydraulic pressure of the first sealed space.

15. The clutching apparatus of claim 14, wherein an internal rim of the second piston is radially exterior to the internal rim of the first piston and slidably contacts the internal rim of the first piston.

16. The clutching apparatus of claim 11, wherein the stopper is formed as a snap ring fitted on the input shaft.

17. The clutching apparatus of claim 11,
  wherein external rims of the first and second pistons are coaxially disposed; and
  wherein the external rim of the first piston slidably contacts the clutch drum and a seal is mounted between the external rim of the first piston and the clutch drum.

18. The clutching apparatus of claim 17, wherein the external rim of the first piston slidably contacts an external rim of the clutch drum.

19. The clutching apparatus of claim 17, wherein the second piston includes a receiving groove at a side of the second piston to slidably receive the external rim of the first piston therein.

* * * * *